Inventor
Lovel R. Simmons
By Harold M. Knott
Att'y.

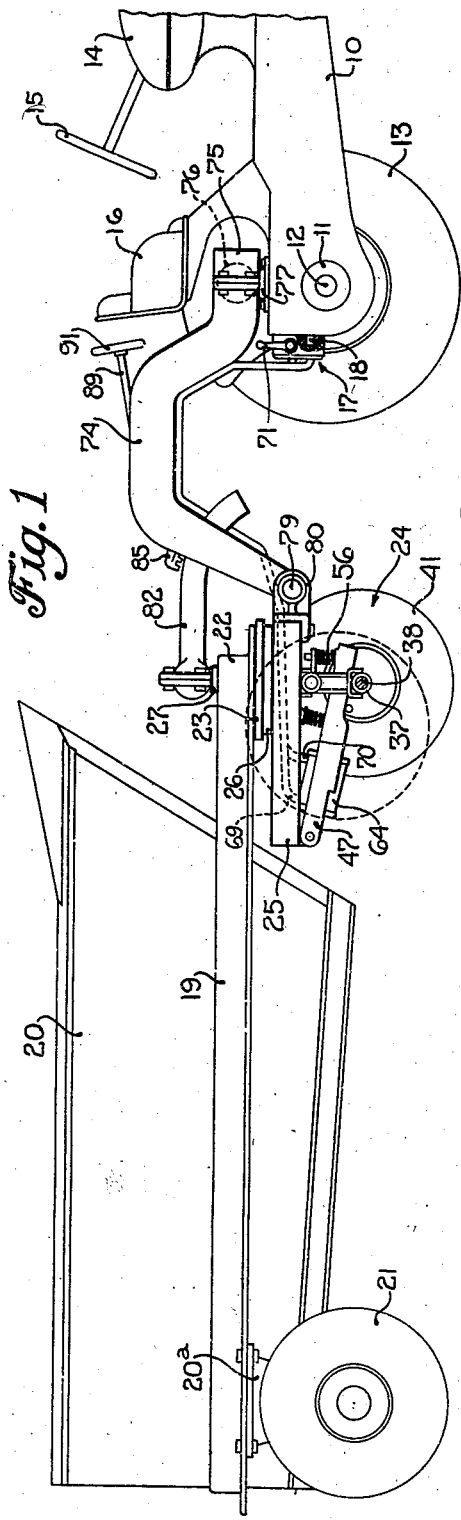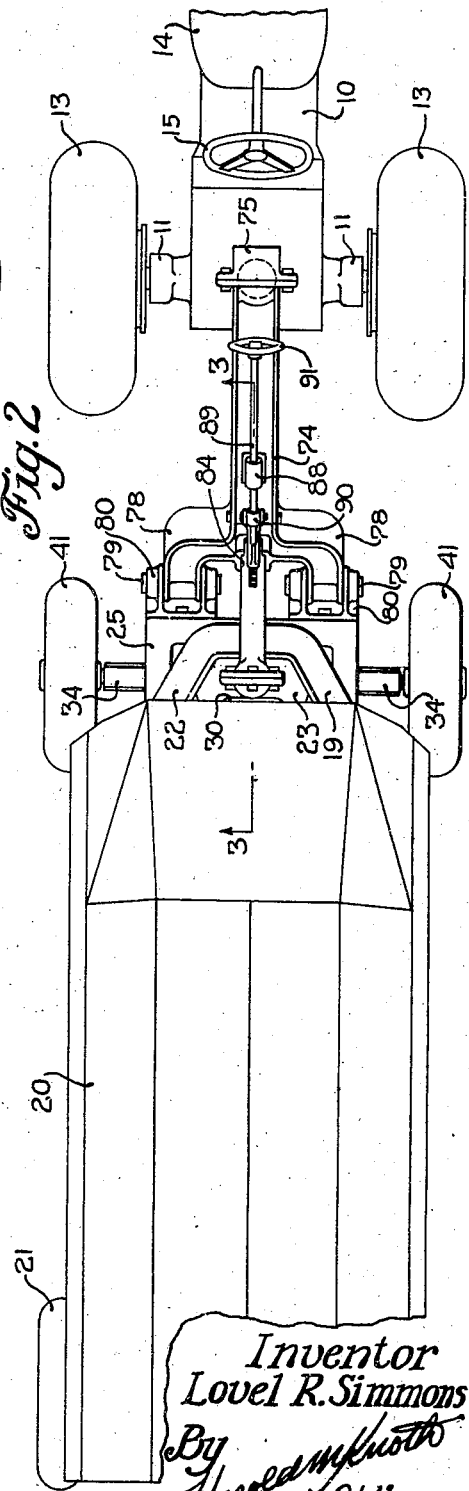

Dec. 23, 1941.  L. R. SIMMONS  2,266,913
HAULING UNIT
Filed April 10, 1940  3 Sheets-Sheet 3

Inventor
Lovel R. Simmons
By Harold M. Knoth
Att'y.

Patented Dec. 23, 1941

2,266,913

UNITED STATES PATENT OFFICE 2,266,913

HAULING UNIT

Lovel R. Simmons, Jackson, Miss.

Application April 10, 1940, Serial No. 328,917

22 Claims. (Cl. 280—33.2)

This invention relates to a combination unit comprising a power or traction vehicle and a trailing or propelled vehicle. More particularly the invention relates to a unit of the type represented in one particular instance by the combination of a tractor and trailer having improved means for temporarily supporting the weight of the trailing vehicle on the tractor for the purposes of relieving the front wheels of the trailer of this weight, thereby transferring at least part of the weight of the trailer to the tractor to increase the tractionability of the traction elements.

The invention contemplates adaptation to various types of vehicles in which a first vehicle supplies the draft or propelling power for moving a second vehicle over the ground. Such a unit may consist of a power vehicle in the form of a tractor and a trailing or propelled vehicle such as a trailer, grader, scraper or the like.

The fundamental principles of the invention have been broadly stated in my co-pending application, Serial Number 327,446, filed April 2, 1940. Generally stated, these principles include the adaptation of the weight of the trailing vehicle to the power vehicle or tractor for increasing the traction of the tractor drive wheels. The fundamental design of a semi-trailer provides for a unit in which the trailer is supported at its forward end on the tractor and at its rearward end on the trailer wheels. One of the peculiar disadvantages of such a unit is that the rear part of the tractor must be specially constructed in order to carry the superimposed weight of the forward end of the trailer. A unit including a four-wheeled trailing vehicle differs from that previously described in that the trailer is carried entirely on the front and rear trailer wheels, and the draft connection between the tractor and trailer is subject to only draft forces, or such forces as are imparted from the tractor to the trailer or from the trailer to the tractor as the two vehicles move along over the ground. A peculiar disadvantage of this type of unit is that the tractor must be provided with special traction devices in order to enable the wheels to obtain sufficient traction under certain circumstances.

The principal object of the present invention is to provide means for temporarily supporting the proximate end of a trailing vehicle of the four-wheeled type on the proximate end of a tractor or other power vehicle, whereby special traction devices may be eliminated, being replaced by the optional shifting of trailer weight between the front wheels of the trailer and the rear wheels of the tractor.

An important object is to achieve this result by the use of a trailing vehicle having front wheels removable from normal load-carrying position.

Another important object is to provide the trailer with retractible wheels.

And, another important object is to provide power means operated by the tractor for retracting the wheels.

A further object is to provide an improved draft connection which is normally subject to only draft forces but which may be held rigid to enable the trailing vehicle to be supported on the tractor instead of on its own front wheels.

Another object is to provide, in a trailer having steerable front wheels, means for locking the wheels against steering.

Other objects and features will appear as the disclosure is more fully made.

Description of figures

Figure 1 is a side view of one form of unit comprising a tractor and a trailing vehicle;

Figure 2 is a plan view of the same;

Description of the preferred structure

Figure 3:
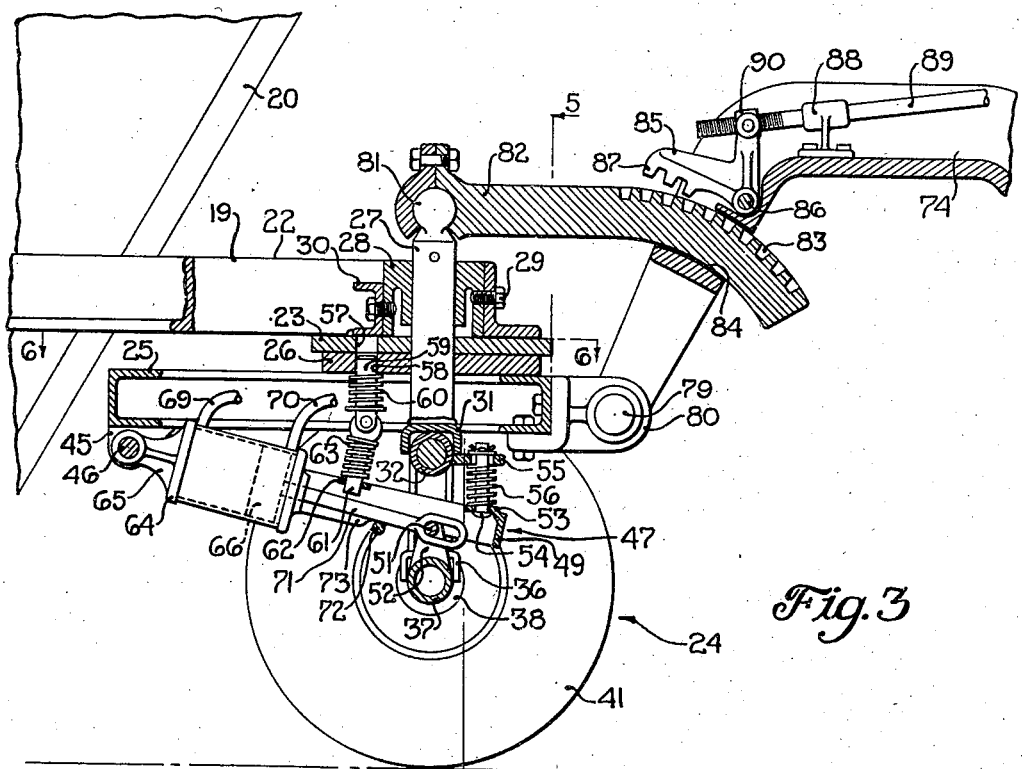
Figure 3 is an enlarged sectional view taken substantially on the line 3—3 of Figure 2.

The particular type of unit chosen for the purposes of illustrating the invention consists of a tractor and a trailer having an articulate draft connection between the rear of the former and the front of the latter. The tractor may be of any suitable type and is shown in the drawings as consisting generally of a main frame 10 having rear axle housings 11 journaling axles 12 to which are connected traction elements in the form of drive wheels 13. Only the rear portion of the tractor is shown. The tractor includes further the customary fuel tank structure 14 at the rear of which is located a steering wheel 15 forwardly of an operator's seat 16. A fluid pump housing 17 is carried at the rear of the main frame 10 and contains suitable mechanism, not shown, driven in the usual manner by a power shaft in the form of the tractor power take-off shaft, generally designated at 18.

The trailing vehicle may be of any suitable type and is here represented as a material-hauling trailer comprising a main frame 19 including a body 20 having an inclined front section and a downwardly and forwardly inclined bottom section. The main frame is provided with a suitable rear axle structure 20a on which is journaled a pair of rear load-carrying wheels 21. The forward end of the main frame 19 converges as at 22 and is provided with an upper turntable member 23 of a turntable structure incorporated as part of a front wheel assembly 24. This assembly includes a sub-frame 25 preferably formed of a channel as shown in Figure 3. This sub-frame has rigidly carried at an upper portion thereof a transverse plate member 26 forming the lower half of the turntable structure. The turntable parts 23 and 26 are mounted for relative pivotal movement about a vertical axis. A vertical standard or pivot member 27 extends through the turntable parts 23 and 26. The upper portion of the standard 27 is journaled in a housing 28 rigidly secured by bolts 29 to the forward end portion 22 of the trailer main frame 19. A transverse channel member 30 is disposed across the opposite sides of the front portion 22 of the main frame 19 and is further rigidly secured to the housing 28 and may be welded to the upper surface of the upper turntable member or part 23.

Figure 5:
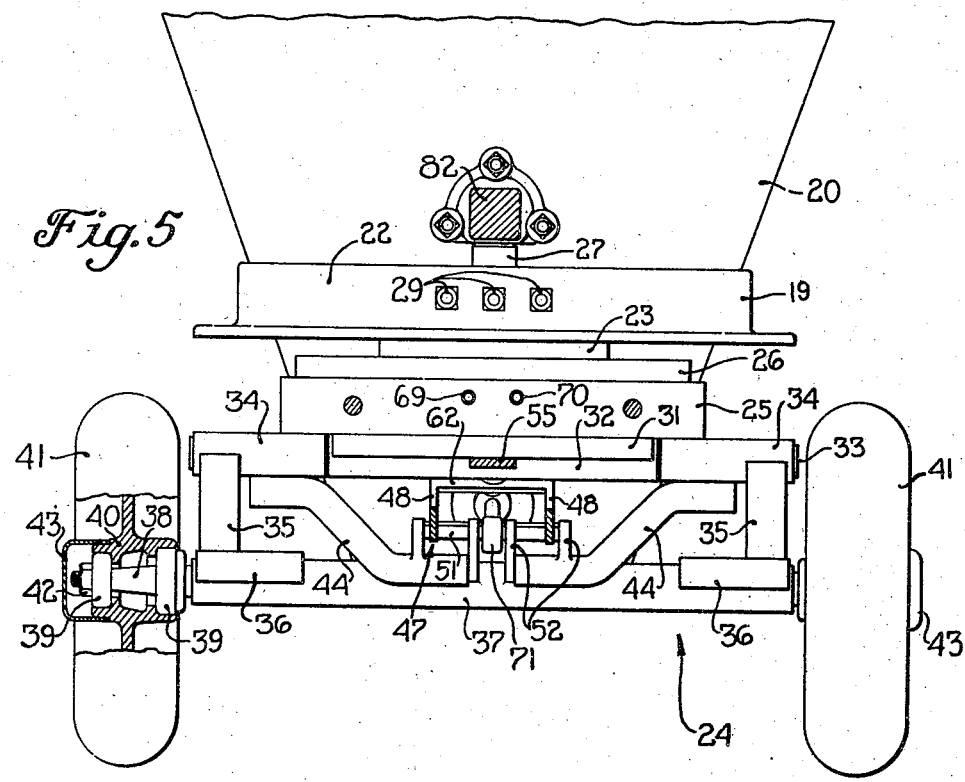
Figure 5 is a front elevational view partly in section taken substantially along the line 5—5 of Figure 3; and, Figure 6 is a plan view, in section, taken substantially along the line 6—6 of Figure 3.

The standard 27 extends downwardly through the turntable part 26 and has its lower end rigidly secured, as by welding, to a transverse channel member 31 rigidly secured to the upper portion of the sub-frame 25. This channel member 31 is in turn rigidly secured, as by welding, to a transverse tubular member 32 forming part of the front axle or wheel assembly 24. This tubular member 32 serves to journal a transverse shaft 33 which is substantially longer than the member 32, extending at opposite sides of the sub-frame 25. Each of the extending end portions of the shaft 33 carries rigidly thereon a sleeve member 34 having downwardly depending support members 35 secured respectively at their lower ends to short channel sections or members 36. The members 36 are rigidly secured respectively to the upper end portions of a transverse tubular axle member 37. The opposite end portions of the tubular axle 37 respectively carry stub axles or spindles 38, only one of which is shown in Figure 5, wherein the right-hand front wheel is shown partly in section. As shown in this portion of the figure, the spindle 28 carries a pair of spaced anti-friction bearings 39 journaling thereon the hub 40 of a wheel 41. Each wheel is held in place on the spindle 38 by means of a nut 42, and the outer end of the hub assembly is closed by a cap 43. It will be understood, of course, that the mounting of both front wheels 41 is the same. The front axle assembly is further reenforced as between the members 37 and 34 by the provision of a pair of channel members 44, each of which has its upper end portion welded or otherwise rigidly secured to the member 34 and each of which inclines downwardly and inwardly where it is rigidly secured to an intermediate portion of the axle member 37. The arrangement thus far described provides a rigid front axle structure pivotally carried on the shaft 37 which is journaled in the transverse member 32 forming part of the sub-frame 25. It will thus be seen that the front wheel assembly 24 may have rearward swinging movement about the transverse axis passing through the shaft 33.

Figure 6:
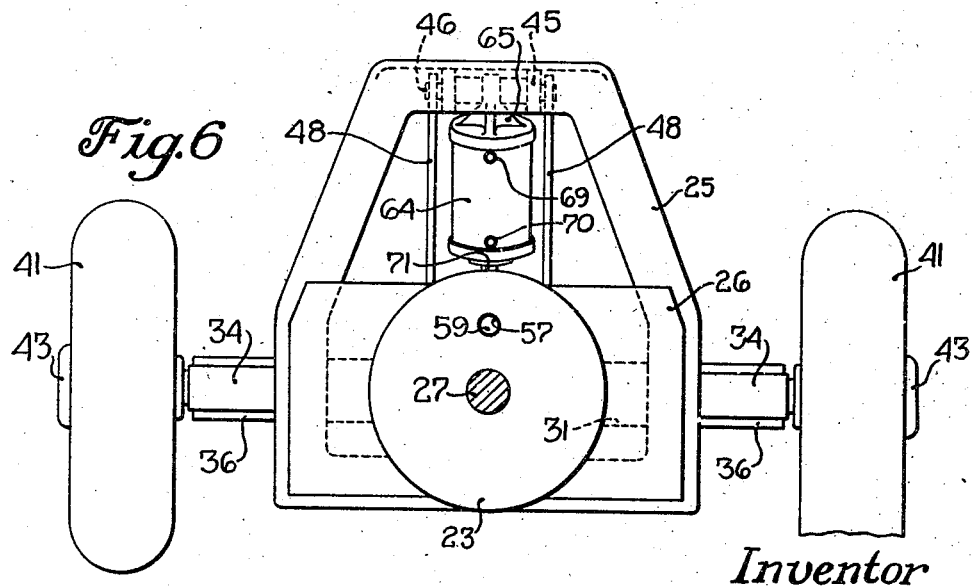

As best shown in Figures 3 and 6, the front structure is provided with means for locking the wheels 41 in load-carrying position. For this purpose the rear end of the sub-frame is provided with a depending bracket structure 45 carrying a tranverse pivot pin 46. This pin serves to pivotally mount a forwardly extending locking member in the form of the frame 47 extending above and forwardly of the front axle 37. This frame comprises a pair of spaced, longitudinally extending legs 48 joined together at their forward ends by an integral transverse portion 49. Each of the legs 48 is provided at its under side with a notch 50 serving to engage a transverse pin 51 rigidly carried by a plurality of upstanding ears 52 in turn rigidly carried by the front axle member 37. The engagement of the member 47 with the pin 51 on the front axle structure serves to prevent rearward or forward pivoting movement of the axle structure about the shaft 33. In order that constant engagement be maintained between the locking parts thus provided, the tranverse front portion 49 of the member 47 is provided with a transversely and rearwardly extending ear 53 apertured to receive a vertical pin 54, which in turn passes through an apertured ear 55 rigidly carried by the upper tubular member 32. A coil spring 56 is carried by the pin 54 between the ears 53 and 55 and serves to urge the locking member 47 downwardly into engagement with the pin 51.

As previously mentioned, the turntable parts 23 and 26 are relatively rotatable about a vertical axis in the usual manner. In the particular construction illustrated, the lower turntable part 26 forms an integral part of the sub-frame structure 25. According to the present invention, means are provided for locking the turntable parts against relative movement about the axis of the standard 37. For this purpose the upper turntable part 23 is provided with a vertically disposed opening 57 and the lower turntable part 26 is provided with a vertically disposed opening 48. When the front wheel assembly 24 is in straight-ahead position, the openings 57 and 58 are vertically alined. The turntable part 26 carries in the opening 58 a vertically slidable pin 59 carrying a coil spring 60. The member 59 is pivotally connected by a transverse pin to a second member 61 slidably engaging an ear 62 provided on the member 47. This second pin is also provided with a coil spring 63, which spring is considerably stronger than the coil spring 60. The spring 60 is normally under compression to maintain the pin 59 out of engagement with the opening 57 in the upper turntable part 23. The spring 63 is normally under only sufficient compression to maintain the parts in the position shown in Figure 3. It will be appreciated that the spring 63 could not be disposed under compression or it would tend to urge the member 59 into engagement with the opening 57 in the turntable part 23. As will hereinafter appear, however, the spring 63 is adapted to be compressed to a sufficient extent to overcome the slight compression under which the spring 60 is disposed.

It is an object of the present invention to provide power operated means for removing the wheels 41 from the load-carrying position. One particular form of power means, as illustrated, may comprise a fluid cylinder 64 of the hydraulic type. This cylinder is provided with a rear bracket portion 65 pivotally carried on the transverse pin 46 carried by the sub-frame 25. The cylinder is provided with a piston 66 having a forwardly extending piston rod 67 provided at its forward end with an enlarged portion having a longitudinal slot 68 engaging the pin 51, previously referred to as being carried by the transverse front axle member 37 and engageable by the notches 50 in the locking member 47. This cylinder is preferably of the two-way type and is supplied with fluid from the pump 17 carried by the tractor. For this purpose the cylinder is provided with a conduit 69 at its rear end and a second conduit 70 at its forward end. The supply of fluid from the pump 17 is alternately controlled through the pump 17 in the usual manner. A control member is provided on the pump, generally designated by the numeral 71. It will be understood that the particular power means illustrated is not the only type of means that may be utilized, and accordingly it is not intended that the particular means form any part of the present invention except in so far as necessary to illustrate one means for retracting the front wheels from load-carrying position.

The power operated means is also adapted to simultaneously unlock the front axle assembly so that it may be swung rearwardly and upwardly. For this purpose the piston rod 67 is provided with a transverse bar or member 72 engageable at opposite sides with cam portions 73 provided respectively on the legs 48 of the locking member 47. Thus, when the piston moves rearwardly because of fluid supplied through the conduit 70 to the forward end of the cylinder, the member 72 engages the cam members 73 on the locking member 47 to move the locking member upwardly for the purpose of disengaging the notches 50 from the transverse pin 51 on the axle member 37. A more detailed description of the operation of this feature will appear below.

For the purpose of moving the trailer along the ground with the tractor an articulate draft connection is provided. This connection comprises a draft element 74 having its forward end provided with a socket portion and cap 75 connected to a ball 76 provided as part of a member 77 rigidly carried at the upper portion of the main frame 10 of the tractor. It will be noted that the connection between the draft member 74 and the tractor provide a connection on transverse and vertical pivot axes disposed vertically above the axis of the drive axles 12. This arrangement is important inasmuch as it prevents tipping of the tractor when the weight of the trailer is applied thereto, all as will hereinafter appear.

The draft element 74 is of the upwardly arched type having an intermediate portion disposed at a height above that of the upper portion of the drive wheels 13, whereby particularly short turning of the tractor is permitted. The rearward end of the draft connection is provided in the form of a Y and has opposite leg portions 78 pivotally connected on a coincident transverse axis by a pair of pins 79 carried in brackets 80 secured to the forward end of the sub-frame 25. The flexible or articulate draft element 74 between the tractor and the trailer provides for relative vertical movement between those vehicles as varying ground contour is encountered.

As previously mentioned, an important feature of the invention is the provision of means for holding the draft connection rigid with respect to at least one of the vehicles, the draft connection thereby serving as means for supporting the trailing vehicle on the power vehicle or tractor. To this end, the upper end of the standard 27 is provided with a ball 81 having connected thereto the rearward socket end of a holding member 82 having its forward end curved on a radius taken about the axis of the pivot pins 79 by which the draft member 74 is connected to the sub-frame 25. The upper surface of the member 82 is provided with a plurality of teeth 83. As best shown in Figures 1 and 3, the intermediate portion of the draft element 74 at the junction of the main portion thereof with the legs 78 is provided with an arcuate opening 84 normally slidably carrying the curved end portion of the member 82. The slidability between the parts 82 and 74, and the ball and socket connection between the member 82 and the standard 72, enables free flexibility of movement between the tractor and the trailer during normal operation. Since the connection of the member 82 with the standard 72 is on the vertical steering axis of the front wheel assembly 24, and since the arc of movement of the member 82 through the opening 84 is about the axis of the transverse pivot connection 79, the respective parts have free relative movement and no interference therebetween is encountered.

Figure 4:
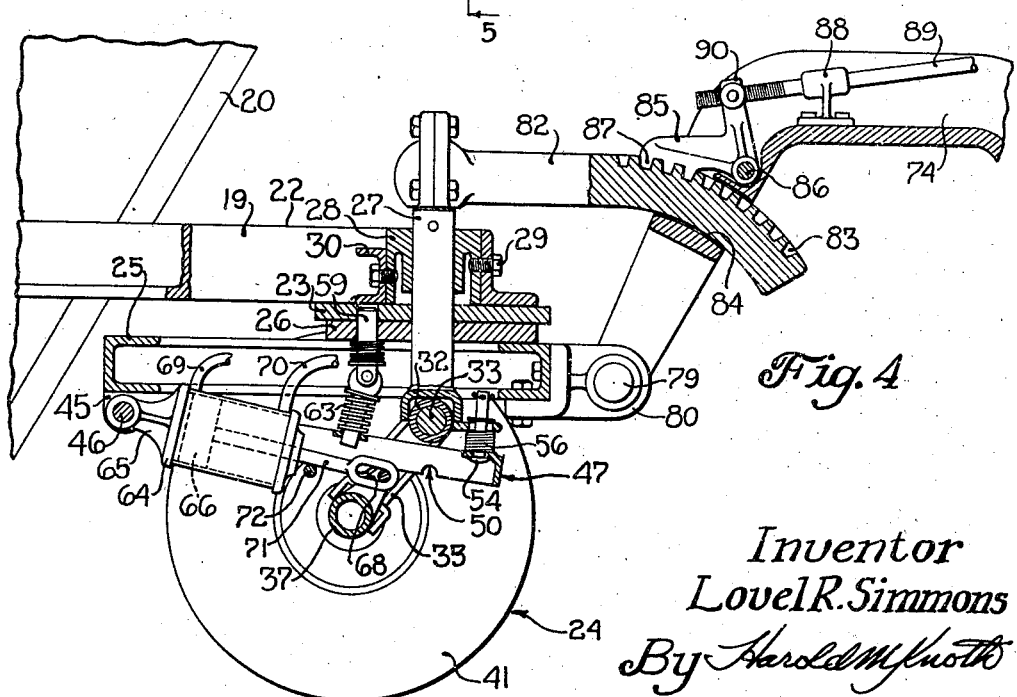
Figure 4 is a similar sectional view showing the trailer wheels removed from load-carrying position.

The means for locking the draft element rigid with respect to one of the vehicles will now be described. This means may assume any form and is herein illustrated as a locking means comprising a locking member 85 in the form of a bell crank carried on a transverse pivot pin 86 in the draft element 74. One portion of the member 85 is provided with teeth 87 adapted to be engaged with the teeth 83 in the member 82. For the purpose of operating the member 85 for engagement with the teeth in the member 82, the draft element 74 is provided with a journal bracket 88 carrying a longitudinally extending rod 89 having one end threaded into a trunnion member 90 on the member 85, and having its other end provided with a member in the form of a hand wheel 91. The hand wheel 91 is conveniently disposed in the vicinity of the operator's station 16 and may be readily operated to move the member 85 into engagement with the member 82, as appears in Figure 4.

Description of operation

The normal operation of the unit takes place with the component parts of the unit in the positions indicated in Figures 1, 2, and 3. In this position of the unit the member 82 is free to slide through the opening 84 in the draft element 74. The turntable locking pin 59 is disengaged from the upper turntable part 23 and is held in that position by the spring 60. The locking member 47 is in positive engagement with the front wheel assembly 24 and is held in that position by the relatively strong compression spring 56. The control member 71 on the pump 17 is disposed in a neutral position so that no fluid is supplied to either end of the cylinder 64. During normal operation of the unit, under conditions where the tractor is enabled to obtain sufficient traction to move the trailing vehicle efficiently, there is no need to change the positions of the parts as indicated. However, when conditions arise under which the tractor drive elements or wheels 13 begin to slip under the load applied to the trailing vehicle, it is desirable that a portion of the weight of the trailing vehicle be applied to the tractor to enable the tractor to obtain the necessary traction. As previously mentioned, prior units required that the tractor be equipped with wheel weights or other special traction devices. Because of the difficulty and time-consuming labor required in installing and removing such devices, it became a practical necessity that such devices were continuously attached to the tractor, and accordingly became burdensome during operation of the tractor wherein they were not needed. According to the present invention the particular parts of the unit are utilized to accomplish tractionability, and yet no increased burden is provided when the tractor is enabled to operate under conditions not requiring special traction devices. It will be appreciated that the tractor may be of a construction having sufficient power to move a four-wheeled trailer at relatively high speeds over favorable ground conditions. Such tractors ordinarily have sufficient power to move a trailing or propelled vehicle of considerable weight. Yet, the possibility of efficiently obtaining traction has militated against the extensive use of four-wheeled trailers. According to the present invention, a portion of the weight of the trailing vehicle may be temporarily superimposed or supported on the tractor whenever traction is needed. The temporary transfer of weight is not sufficient to harm the tractor construction.

Accordingly, when it is desired to increase the traction on the tractor wheels 13, according to the presently illustrated form of the invention, it becomes necessary only to lock the members 82 and 74 and to supply fluid to the cylinder 64 for the purpose of retracting the front wheels 41. It may be mentioned at this point that substantially the same results will be obtained by locking the members 82 and 74 and then removing the wheels 41 from their spindles 38. This is an important feature of the invention when it is desired to convert the four-wheeled unit into a semi-trailer unit for any period of time, for the trailer, with the wheels 41 removed, has considerably increased clearance at its front end.

After the crank 89 is operated to move the member 85 into engagement with the teeth on the member 82, the control member 71 is moved to permit a supply of fluid through the conduit 70 to the forward end of the cylinder 64, thus moving the piston 66 rearwardly. As provided by the slot 68 in the forward end of the piston rod 67, initial rearward movement of the rod 67 serves to release the locking member 47 because of engagement between the member 72 on the rod and the cam member 73 on the locking member 47. It will be noted that this initial movement of the rod 67 is along a line constantly disposed between the points 46 on the sub-frame 25 on the axle assembly 24. The locking member 47 is moved upwardly against the compression of the coil spring 56. Continued rearward movement of the rod 71, after disengaging the notches 50 from the pin 51 causes engagement between the end of the rod and the pin 51, whereby the front wheel assembly 24 is swung upwardly and rearwardly about the transverse axis of the shaft 33 on the sub-frame 25. Continued rearward movement of the rod 71 moves the locking member 47 continually upwardly. If the openings 57 in the turntable part 23 and 58 in the turntable part 26 are alined, the locking pin 59 will be moved into the opening 47 (Figure 4) because of the increased compression on the spring 63 caused by upward movement of the member 47. As previously mentioned, the spring 63 is comparatively stronger than the spring 60, and the initial compression on the spring 60 is readily overcome. Since the piston rod maintains the position shown in Figure 4, the locking member 47 is held in its position, thus effectively locking the turntable parts against relative movement about the standard 27. In the event that the turntable parts are not disposed so that alinement of the openings 47 and 58 is not possible, upward movement of the locking member 47 will tend merely to compress the spring 63 against the resistance of the now immovable pin 59. The spring 63 will thus be disposed under considerable compression, so that when the turntable parts do become alined, the locking pin 59 will be forced into the opening 57 in the turntable part 23.

It will thus be seen that when the parts are arranged as described, the draft element 74 and the front construction of the trailer is substantially unitary; that is to say, the draft element 74 is held rigid with respect to the frame 19 of the trailer and the front wheel assembly 24 is held against steering movement by the locking pin 59. Accordingly, the only pivot between the tractor and the trailer is that established by the ball and socket connection 75, 76 on the tractor. The unit is then effectively and temporarily converted into a semi-trailer unit, and the front portion of the trailing vehicle is temporarily supported on the tractor instead of on the front wheels 41.

When it is desired to return the wheels 41 to load-carrying position, the control member 71 on the pump 17 is operated in the usual manner to supply fluid through the conduit 69 to the rear of the cylinder 64 and piston 66. The front wheel assembly is then swung downwardly and forwardly about the shaft 33 until the position of the parts indicated in Figure 3 are again assumed. The springs 56 and 60 serve to lock the assembly and to release the turntable, respectively.

From the foregoing description it will be seen that the desirable objects previously set forth are admirably attained according to a preferred form of the invention. Certain other objects and features will be apparent to those skilled in the art. It will be appreciated that the particular form of the invention illustrated is but one of the many forms in which the invention may be applied, and it is thus obvious that numerous modifications and alterations may be made in that preferred construction without departing from the spirit and scope of the invention as defined in the appended claims.

What is claimed is:

1. In combination, a power vehicle, a trailing vehicle having front and rear wheels normally riding the ground and carrying said vehicle, means mounting the front wheels on the trailing vehicle for movement with respect to the trailing vehicle from normal ground position, an articulate draft connection between the rear of the power vehicle and the front of the trailing vehicle and normally subject to only draft forces, means for locking the draft connections rigid with respect to one of the vehicles, and means for moving the front wheels of the trailer at least partially from total weight carrying position.

2. In combination, a power vehicle, a trailing vehicle having front and rear wheels normally riding the ground and carrying said vehicle, means mounting the front wheels on the trailing vehicle for at least partial removal with respect to the trailing vehicle from normal ground position, an articulate draft connection between the rear of the power vehicle and the front of the trailing vehicle and normally non-weight-supporting as respects the trailing vehicle, and means for locking the draft connection rigid with respect to one of the vehicles.

3. In combination, a draft vehicle, a trailing vehicle having front and rear ground supports normally riding the ground and carrying said vehicle, means mounting the front supports for removal with respect to the trailing vehicle from at least total vehicle-carrying position, a draft connection between the rear of the draft vehicle and the front of the trailing vehicle normally subject to only draft forces between the vehicles and providing for relative vertical movement between the vehicles as said vehicles follow ground contour, and means carried by one vehicle and engageable with the draft connection to superimpose at least part of the weight of the trailing vehicle on the draft vehicle after the front support of the trailing vehicle has been removed from vehicle-carrying position.

4. In combination, a draft vehicle, a trailing vehicle having front and rear ground supports normally riding the ground and carrying said vehicle, means mounting the front support for removal with respect to the trailing vehicle from at least total vehicle-carrying position, a draft connection between the rear of the draft vehicle and the front of the trailing vehicle normally subject to only draft forces between the vehicles and providing for relative vertical movement between the vehicles as said vehicles follow ground contour, and means carried by one vehicle and engageable with the other vehicle to support at least part of the weight of the trailing vehicle on the draft vehicle after the front support of the trailing vehicle has been removed from vehicle-carrying position.

5. In combination, a draft vehicle, a trailing vehicle having front and rear ground supports normally riding the ground and carrying said vehicle, means mounting the front support for removal with respect to the trailing vehicle from at least total vehicle-carrying position, a draft connection between the rear of the draft vehicle and the front of the trailing vehicle normally subject to only draft forces between the vehicles and providing for relative vertical movement between the vehicles as said vehicles follow ground contour, and means carried by one vehicle and engageable with the draft connection to transmit through the draft connection at least part of the weight of the trailing vehicle to the draft vehicle after the front support of the trailing vehicle has been removed from vehicle-carrying position.

6. In combination, a draft vehicle, a trailing vehicle having front and rear ground supports normally riding the ground and carrying said vehicle, means mounting the front support for removal with respect to the trailing vehicle from at least total vehicle-carrying position, a draft connection pivotally connected at one end on a transverse axis to the rear of the draft vehicle and pivotally connected at its other end on a parallel axis to the front of the trailing vehicle and normally subject to only draft forces, and means for locking said draft connection rigid with respect to one of said vehicles.

7. In combination, a draft vehicle, a trailing vehicle having front and rear ground supports normally riding the ground and carrying said vehicle, said front support being steerable, means mounting the front support for removal with respect to the trailing vehicle from at least total vehicle-carrying position, draft means between the front of the trailing vehicle and the rear of the draft vehicle normally articulately interconnecting the vehicles and normally subject to only draft forces, means operative by the draft means to steer the front support of the trailing vehicle, means for holding the draft means rigid with respect to one of said vehicles, and means for holding the front support against steering.

8. In combination, a draft vehicle, a trailing vehicle having front and rear ground supports normally riding the ground and carrying said vehicle, said front support being steerable, means mounting the front support for removal from at least total vehicle-carrying position, draft means between the front of the trailing vehicle and the rear of the draft vehicle normally articulately interconnecting the vehicles, means operative by the draft means to steer the front support of the trailing vehicle, means for holding the draft means rigid with respect to one of said vehicles, means for locking the front support against steering, means for moving the front support from at least total vehicle-carrying position, and means operable by the last named means to actuate the locking means.

9. In combination, a draft vehicle, a trailing vehicle having front and rear ground supports normally riding the ground and carrying said vehicle, said front support being steerable, means mounting the front support for removal from at least total vehicle-carrying position, draft means between the front of the trailing vehicle and the rear of the draft vehicle normally articulately interconnecting the vehicles, means operative by the draft means to steer the front support, means for holding the draft means rigid with respect to one of said vehicles, means for holding the front support against steering, means for moving the front support from at least total vehicle-carrying position and including a connection operable to hold the front support against steering.

10. In combination, a power vehicle having traction elements, a second vehicle disposed adjacent the power vehicle to be moved over the ground thereby, means flexibly connected to the power vehicle and to the second vehicle for joint movement of said vehicles over the ground, said means providing normally for relative vertical movement of said vehicles and being normally subject to only motive forces, ground supports on the second vehicle normally riding the ground and carrying substantially the entire weight of said second vehicle, one of said supports being disposed in the vicinity of the aforesaid flexible connecting means, means mounting said support for removal with respect to the second vehicle from at least total weight carrying position, and means connectable between the vehicles to support part of the weight of the second vehicle on the first when the aforesaid ground support is removed from at least total weight carrying position.

11. In combination, a power vehicle having traction elements, a second vehicle disposed adjacent the power vehicle to be moved over the ground thereby, means flexibly connected to the power vehicle and to the second vehicle for joint movement of said vehicles over the ground, said means providing normally for relative vertical movement of said vehicles and being normally subject to only motive forces, ground supports on the second vehicle normally riding the ground and carrying substantially the entire weight of said second vehicle, one of said supports being disposed in the vicinity of the aforesaid flexible connecting means, means mounting said support for removal with respect to the second vehicle from at least total weight carrying position, and means connectable between one vehicle and the aforesaid flexible connecting means to support part of the weight of the second vehicle on the first through said connecting means when the aforesaid ground support is removed from carrying position.

12. In combination, a power vehicle, a trailing vehicle having front and rear wheels normally riding the ground and carrying said vehicle, means mounting the front wheels on the trailing vehicle for removal with respect to the trailing vehicle from normal ground position, an articulate draft connection between the rear of the power vehicle and the front of the trailing vehicle normally subject to only draft forces, and means connectable between the vehicles for supporting at least part of the weight of the front of the trailing vehicle on the power vehicle when the front wheels of the trailing vehicle are removed at least partially from carrying position.

13. In combination, a first unit having traction elements, a second unit disposed with one end proximate to one end of the first unit, spaced ground supports on the second unit, one of said supports being disposed adjacent the aforesaid proximate end of said second unit, means mounting said last named ground support for removal through a range of movement with respect to the second unit to and from ground position, the second unit being normally entirely supported on the ground supports, means flexibly connecting said units for movement together along the ground, and said means being normally subject to only the forces of that movement, and means connectible between the units for supporting the proximate end of the second unit on the first unit when the aforesaid ground support is removed at least partially from ground position.

14. In combination, a first unit having traction elements, a second unit disposed with one end proximate to one end of the first unit, spaced ground supports on the second unit, one of said supports being steerable, one of said supports being disposed adjacent the aforesaid proximate end of the second unit, means mounting said last named ground support for removal through a range of movement with respect to the second unit to and from ground position, the second unit being normally entirely supported on the ground supports, means flexibly connecting said units for movement together along the ground, said means being normally subject to only the forces of that movement, means for holding the steerable ground support against steering, and means connectible between the units for supporting the proximate end of the second unit on the first unit when the aforesaid removable ground support is removed at least partially from ground position.

15. In combination, a power unit having traction elements, a trailing unit disposed with one end proximate to one end of the power unit, spaced ground supports on the trailing unit, one of said supports being steerable and disposed adjacent the proximate end of the trailing unit, means mounting said last named ground support for removal with respect to the trailing unit to and from ground position, the trailing unit being normally entirely supported on the ground supports, means flexibly connecting said units together for movement together along the ground and subject to only the forces of that movement, means connected between one of the units and the flexible connecting means for supporting the proximate end of the trailing unit on the power unit when the aforesaid ground support is removed at least partially from ground position, and means for holding said support against steering.

16. In combination, a power vehicle having traction elements, a trailing vehicle at the rear of said power vehicle, said trailing vehicle including front and rear load-carrying wheels normally riding the ground, a front turntable structure pivotally carried by the trailing vehicle and carrying the front wheels, means mounting said front wheels on the turntable structure for movement with respect to the trailing vehicle from at least total load-carrying position, a draft element pivotally connected at one end on a transverse axis to the rear of the power vehicle and at its other end on a parallel axis to the turntable structure, means connected between the draft element and the trailing vehicle for holding said element rigid with respect to said vehicle, means for moving the front wheels from at least total load-carrying position, and means for locking the turntable against pivoting.

17. In combination, a power vehicle having traction elements, a trailing vehicle having a body and rear load-carrying wheels, a front truck assembly on the trailing vehicle including steerable wheels retractible with respect to the trailing vehicle body, said front and rear wheels normally riding the ground and carrying the trailing vehicle, a draft element normally subject to only draft forces and articulately connected between the rear of the power vehicle and the front of the trailer and adapted to steer the front wheels, means for holding the draft element rigid with respect to one of the vehicles, means for retracting the front wheels at least partially from carrying position, and means for locking the front wheels against steering.

18. In combination, a power vehicle having traction elements, a trailing vehicle having a body and rear load-carrying wheels, a front truck assembly on the trailing vehicle including wheels retractible with respect to the trailing vehicle body, said front and rear wheels normally riding the ground and carrying the trailing vehicle, a draft element articulately connected between the rear of the power vehicle and the front of the trailer, means for holding the draft element rigid with respect to one of the vehicles, and means for adjustably retracting the front wheels from carrying position.

19. In combination, a power vehicle, a trailing vehicle including a main frame, a sub-frame including a turntable pivotally carried on a vertical axis at the forward end of the main frame, load-carrying wheels carried by the sub-frame, means mounting said wheels on the sub-frame for removal of said wheels with respect to the trailing vehicle main frame from at least partial load-carrying position, an articulate draft element connected between the rear of the power vehicle and the front of the trailing vehicle, means for locking the sub-frame against pivoting on the main frame, and means for holding the draft element rigid with respect to one of the vehicles.

20. In combination, a power vehicle, a trailing vehicle having rear wheels and a steerable front wheel structure including front wheels, said front and rear wheels normally riding the ground and carrying the weight of the trailing vehicle, means mounting the front wheels on the structure for removal thereof with respect to the trailing vehicle from at least total weight carrying position, a draft member articulately connected between the rear of the power vehicle and the front of the trailing vehicle, means for holding said element rigid with respect to one of the vehicles, and means for holding the front structure against steering.

21. In combination, a draft vehicle, a trailing vehicle having front and rear ground supports normally riding the ground and carrying said vehicle, said front support being steerable, means mounting the front support for removal from at least total vehicle-carrying position, draft means pivotally connected for vertical and horizontal movement to the draft vehicle and connected for vertical and horizontal movement to the trailing vehicle for articulately interconnecting the vehicles, means for holding the draft means rigid against vertical movement with respect to one vehicle, means for moving the front support from at least total vehicle-carrying position, and means for holding the draft means rigid against horizontal movement with respect to one of the vehicles.

22. In combination, a first vehicle, a second vehicle disposed in end-to-end relation with the first vehicle and having ground supports, one of said supports being located adjacent and normally supporting that end of the second vehicle proximate to the first vehicle, a normally non-weight-supporting element interconnecting the vehicles for relative vertical movement and for movement together over the ground, means connectible between the aforesaid element and one vehicle for locking said element against vertical movement with respect to at least one vehicle, and means adjustably mounting the aforesaid proximate ground support for movement with respect to the second vehicle through a range from supporting to non-supporting position, whereby the weight of the second vehicle is transferred to the first vehicle through the locked element in proportion to the movement of said ground support from supporting position.

LOVEL R. SIMMONS.